Patented Aug. 31, 1943

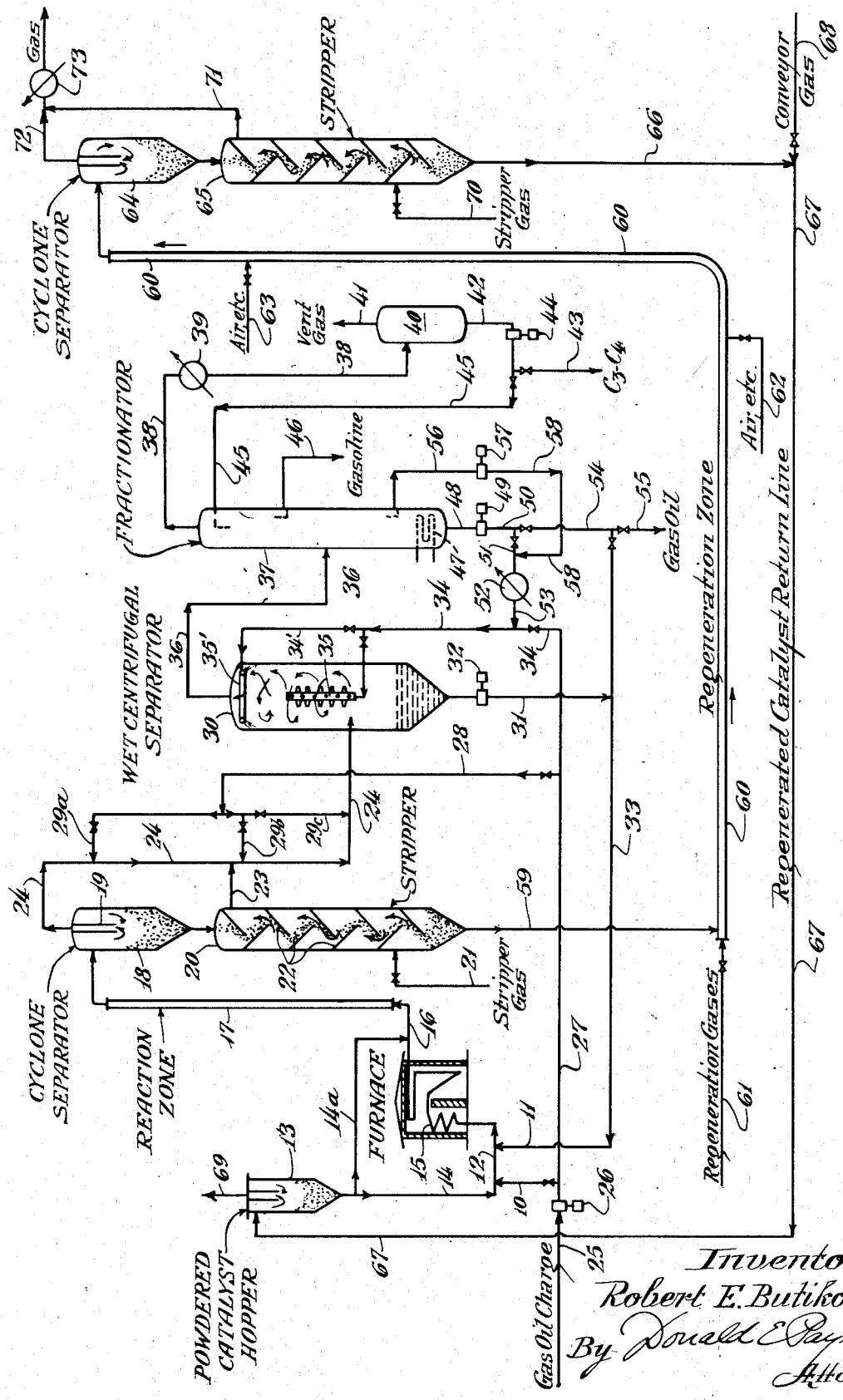

2,328,325

UNITED STATES PATENT OFFICE 2,328,325

POWDERED CATALYST RECOVERY

Robert E. Butikofer, Chicago, Ill., assignor to Standard Oil Company, Chicago, Ill., a corporation of Indiana Application June 29, 1940, Serial No. 343,151

10 Claims. (Cl. 196—52)

This invention relates to catalyst recovery and it pertains more particularly to the removal of powdered catalyst from hot vapor streams.

Many hydrocarbon conversion processes, such as catalytic cracking, catalytic reforming, catalytic isomerization, etc. employ powdered catalyst which is contacted with hydrocarbon vapors at high temperatures in a reaction zone, then separated from the hydrocarbon vapors, regenerated and returned to the contacting step. In such processes considerable trouble has been experienced in removing particles of catalyst from the hot hydrocarbon vapors. Most of the catalyst can be separated from said vapors by centrifugal separation in the so-called cyclone separators but a small amount of catalyst is usually carried with the gases and vapors leaving such separators and entering the hydrocarbon fractionator towers. The residual catalyst then settles out on the bubble trays in the fractionating towers and impairs the quality of the residual oil leaving such towers and increases the difficulty of fractionation. It has been proposed to partially condense the hydrocarbon vapors in a heat exchanger and to recycle the condensate together with the catalyst which accumulates therein to the hydrocarbon conversion step but heat exchangers are likewise plugged by accumulated catalyst material. Furthermore, in many processes it is undesirable to recycle a very large amount of heavy condensate because such material may impair the activity of the catalyst in the subsequent conversion step.

An object of my invention is to avoid the use of heat exchangers for cooling gases and vapors containing powdered catalyst material and to effect the separation of all of the catalyst from said gases and vapors before they are introduced into the fractionating tower.

A further object is to provide an improved method and means for weighting the extremely fine catalyst particles so that they can be removed substantially completely by simple centrifugal means. Even the loss of .1% of catalyst in the separation system may require many tons of catalyst per day in a commercial plant, and complete catalyst separation is therefore a matter of great importance.

A further object is to provide an improved system for employing gas oil as a scrubbing means for removing powdered catalyst from hot hydrocarbon vapors and gases. Other objects will be apparent as a detailed description of the invention proceeds.

The invention is not limited to hydrocarbon conversion processes but is applicable to other systems wherein it is desired to remove finely divided solids from hot gases and vapors. The invention is particularly applicable, however, to catalytic cracking and will be described as applied to that process.

In practicing the invention, I introduce a relatively cold liquid into the hot vapor stream in amount sufficient to cool said stream by the vaporization of the introduced liquid to such a temperature that a partial condensation of the hot hydrocarbon vapors is effected. Alternatively, the introduced liquid may be vaporized and then partially condensed or may be introduced in amounts and at such temperatures that a resulting temperature of incipient condensation is obtained,—in any case the net result is the creation of a fog or mist of condensed hydrocarbons the liquid particle size of which is extremely small. The condensation may be effected on the particles themselves or the particles may be wet by contact with these extremely small droplets so that the catalyst particles which were originally present in the vapors are transferred to be incorporated in or otherwise weighted by the small liquid droplets which are thereafter suspended in the vapors. This mist or fog with its contained solid particles is then separated from the remaining gas and vapors by simple centrifugal separation, the heavier liquid droplets responding to centrifugal action which would be ineffective for the lighter solid particles.

The introduced liquid may be called a "scrubbing liquid" although my invention does not operate in the manner of conventional scrubbers. This scrubbing liquid may be introduced into the hot gases before the gases are introduced into the wet centrifugal separator or the scrubbing liquid may be introduced directly into the wet centrifugal separator. Preferably, this scrubbing liquid, in the case of catalytic cracking, is a gas oil which may be a part or all of the gas oil charging stock or which is preferably a cooled gas oil or heavy naphtha fraction separated from the system and which is effectively recycled within the system itself. The small amount of liquid which is withdrawn from the wet centrifugal separator and which contains the powdered catalyst material, may be returned for introduction with fresh charging stock.

The invention will be more clearly understood from the following detailed description read in conjunction with the accompanying drawing wherein I have diagrammatically illustrated a flow sheet of a catalytic cracking process employing my invention.

Gas oil charging stock from lines 10 or 11 or from both lines is introduced into line 12 into which line powdered catalyst may be injected from storage hopper 13 and line 14, by a suitable device such as pressure screw feeder exemplified by the Fuller-Kenyon pump. The powdered catalyst may be of the activated clay type or the synthetic type and for catalytic cracking it is preferably an activated hydrosilicate of alumina. No novelty is claimed in the catalyst per se and further description is therefore unnecessary. The nature of the catalyst will vary for different processes—for aromatization or reforming (hydro forming) it may be activated alumina with molybdenum oxide or chromium oxide deposited thereon. In any case the particle size will be small and may range from 200 to 10 microns or even smaller in diameter.

The mixture of powdered cracking catalyst and gas oil passes through coils 15 of a pipe still furnace wherein the gas oil is heated to a temperature of about 850 to 1050° F. under pressure which may range from atmospheric to 50 pounds or more per square inch. Preferably the powdered catalyst is added by line 14a to the superheated gas oil vapors leaving the pipe still furnace through transfer line 16 instead of being introduced with the charging stock. The addition of the regenerated catalyst directly to the superheated gas oil vapors in transfer line 16 accomplishes many important advantages. It avoids the severe erosion in pipe still coils that would result if all of this catalyst were passed therethrough. It avoids the undue cooling of the catalyst and wetting of the catalyst with liquid oil. The regenerated catalyst may be at a higher temperature than the temperature of vapors leaving the pipe still coil and they may thus supply the last increment of heat required for effecting the conversion. The small amount of spent catalyst which is recycled to the pipe still coils in the manner hereinafter described has been found to be adequate for keeping the pipe still coils free from coke deposits.

The hot hydrocarbon vapors, carrying the powdered catalyst in suspension, pass from transfer line 16 through reaction conduit 17 which is of such size and length that a reaction time of about 1 to 50 seconds is provided. The amount of catalyst and time of contact vary with different processes and charging stocks but I prefer to employ about 0.2 to 20 pounds of catalyst per pound of oil employed.

Hot reaction products from conduit 17 are introduced into the upper part of cyclone separator 18 which is provided with a central cylindrical baffle 19. Under properly controlled conditions about 99% to 99.9% of the catalyst is separated from the vapors in this cyclone separator, the separated catalyst passing downwardly into stripping tower 20 into the base of which a stripper gas, which may be normally gaseous hydrocarbons produced in the system, steam or any inert gas, is introduced through line 21. The stripper gas is introduced at such a rate that it will not impede the downward flow of the catalyst over inclined baffles 22 but will remove the adsorbed oil therefrom. Enriched stripper gas is withdrawn through line 23 to line 24 through which gases are withdrawn from the top of the cyclone separator.

In practicing my invention I may introduce fresh charging stock from line 25 by pump 26 through lines 27 and 28 and 29a, b and c into the hot gases in line 24 which are en route to wet centrifugal separator 30. The gas oil charging stock so introduced into line 24 is proportioned in amounts and controlled as to temperatures so that its vaporization will lower the temperature of the hot reaction products to the incipient condensing temperature of the heaviest fractions of said products. In other words, I effect a cooling of these hot gases and vapors by the vaporization of gas oil therein instead of by using heat exchangers and in this manner I overcome plugging problems and the fouling of heat exchange surfaces. When gas oil is introduced in such amounts and at such temperatures the highest boiling components of the gas oil and of the reaction products will tend to condense in minute droplets to form a fog or mist. These droplets may condense on the particles of catalyst or they may impinge against particles of catalyst but in any event the remaining catalyst particles in the vapor stream are soon occluded in or wet by these small liquid droplets.

The gas vapor stream containing the mist or fog of liquid droplets is then introduced tangentially into the lower part of wet centrifugal separator 30 at such velocity that the centrifugal force of the swirling gases will be sufficient to throw the liquid droplets to the walls of the separator. Thus a small amount of the liquid which has heretofore been condensed runs down the sides of the centrifugal separator carrying with it all of the solid catalyst particles and this liquid stream together with catalyst material may be withdrawn from the base of the centrifugal separator through line 31 and returned by pump 32 through line 33 to line 11 for reintroduction into line 12.

Instead of or in addition to introducing gas oil charging stock through line 28 to line 24, I may introduce such gas oil through line 34 to the vertical atomizer 35 in the lower central part of wet centrifugal separator 30. The atomizer column 35 may consist simply of a perforated pipe but it is preferably a vertical element provided with a plurality of atomizing nozzles so directed as to augment the centrifugal swirling motion of the gases which are tangentially introduced at the base of the separator and which are finally withdrawn from the top of the separator through line 36 to fractionating tower 37. The same principle is applicable in this case as has been heretofore described—the amount of gas oil introduced through atomizer 35 should be sufficient to effect by its vaporization a lowering of the temperature in this separator to such an extent as to cause the formation of a heavy gas oil mist which picks up the particles of powdered catalyst and carries those particles to the walls of the separator.

To prevent pasty solids from adhering to the walls of separator 30 I provide scrubbing means, preferably in the form of an annular pipe 35' having perforations directed against the inner walls of tank 30. Scrubbing liquid may be introduced into pipe 35' through line 34'. Any number of annular scrubbers of this type may be used or any equivalent means employed to insure the removal of solids thrown out of the vapor stream in separator 30.

From fractionating column 37 gases may be taken overhead through line 38, cooled in cooler 39 and introduced into separator 40 from which uncondensed gases may be withdrawn through line 41 and liquids may be withdrawn through line 42. A portion of these liquids which may be chiefly propane, butane or a mixture thereof may be withdrawn from the system through line 43 and another portion returned by pump 44 through line 45 for use as reflux in the top of tower 37. Cracked gasoline may be withdrawn as a side stream through line 46. The fraction system forms no part of my invention and is therefore shown in simple diagrammatic form. Actually I prefer to take end point gasoline from the top of tower 37 and to stabilize the gasoline in a separate tower.

A reboiler 47 in the base of tower 37 insures the removal of gasoline hydrocarbons from the gas oil which is withdrawn from the base of this tower through line 48. This gas oil may be passed by pump 49 throgh lines 50 and 51 through cooler 52 and line 53 to atomizer 35 for use as a scrubber liquid in wet centrifugal separator 30. Alternatively, it may be withdrawn through line 54 to line 33 for recycling to line 12 or it may be withdrawn from the system through line 55.

My preferred scrubbing liquid is a lighter gas oil fraction which is withdrawn as a side stream from fractionating tower 37 through line 56 and which is passed by pump 57 through lines 58 and 51, cooler 52, line 53 and line 34 to atomizer or distributor 35. The gas oil thus removed as a side stream does not require as much cooling as the gas oil removed from the bottom of tower 37 and is in general a cleaner and more desirable scrubbing liquid for removing the suspended catalyst particles from the vapor stream. Practically speaking, this gas oil flows in a continuous cycle from fractionating tower 37 to centrifugal separator 30 and then back to fractionating tower 37, only a very small part of the gas oil actually condensing in the centrifugal separator. One of the features of my invention is the extremely small amount of liquid which has to be returned through lines 31, 33 and 11 to carry the separated catalyst back to the heating coils the amount of this liquid being only about 5 to 20% of the total gas oil resulting from the process.

When gas oil charging stock is employed as a scrubbing liquid and introduced through either lines 28 or 34, then this charging stock is introduced into the coils of the pipe still chiefly through lines 54, 33 and 11 although a small amount of the gas oil will find its way back through lines 31, 33 and 11. When the scrubbing liquid is obtained from side draw-off line 56 all of the gas oil charging stock may be introduced into line 12 through line 10 and in this case it may be desirable to withdraw the cracked gas oil from the system through line 55 instead of recycling it. If charging stock is used as a scrubbing liquid it should be higher boiling than gasoline so that it may be separated from the gasoline in tower 37 and passed to the cracking step.

The bulk of the catalyst, usually about 99% to 99.9% thereof, is withdrawn from the stripper column 20 through line 59 and introduced by means of a Fuller-Kenyon screw pump or other suitable means into regenerating conduit 60 into which air or other regeneration gases may be introduced through lines 61, 62 and 63. The regenerated catalyst is separated from regeneration gases in cyclone separator 64, the catalyst passing downwardly through stripping column 65 and line 66 to return line 67. A pneumatic conveyor gas may be introduced through line 68 for conveying the regenerated and stripped catalyst back to hopper 13 from which conveyor gases may be vented through line 69.

The stripper gas for column 65 may be hot flue gas, steam, or any inert gas which is suitable for removing the oxygen-containing gases from the powdered catalyst. Such stripper gases are introduced through line 70 and withdrawn through line 71. These gases together with regeneration gases from cyclone separator 64 are passed through line 72 and heat transfer means 73 which may be a waste heat boiler or any other device for utilizing the heat contained in these regeneration gases.

While I have described in detail a preferred embodiment of my invention it should be understood that I do not limit myself to the use of gas oil as a scrubbing liquid since any liquid may be used which will not interfere with the process in which the invention is used. Wherever I have shown a single cyclone separator it should be understood that a plurality of such separators may be used. Other embodiments and modifications of the invention will be apparent to those skilled in the art from the above description of my preferred embodiment.

I claim:

1. The method of separating powdered catalyst from hydrocarbon conversion products which comprises introducing a mixture of hot hydrocarbon conversion products and powdered catalyst into a dry separation zone, separating about 95 to 99.9% of said catalyst from said gases and vapors in said dry separation zone, injecting liquid gas oil into the gases and vapors leaving said dry separation zone, the amount and temperature of said gas oil being regulated to reduce the temperature of the hydrocarbon gases and vapors to the incipient condensation temperature of the heaviest constituents thereof whereby a mist of liquid droplets is formed in said stream for weighting the solid catalyst particles, subjecting said mist to centrifugal force in a catalyst separation zone for separating the liquid particles from the gases and vapors, withdrawing liquids together with substantially all of the solids from the base of said last-named separation zone, and introducing gases and vapors from the top of said last-named separation zone into a fractionation zone at an intermediate point therein.

2. The method of removing powdered catalyst from hot hydrocarbon conversion gases and of preventing catalyst from entering a fractionation zone which comprises introducing said hot hydrocarbon gases and vapors tangentially at the base of a circular separation zone whereby a swirling motion is obtained, introducing gas oil into said swirling gases and vapors in amounts sufficient to lower the temperature thereof to the incipient condensation temperature of the heaviest reaction products therein whereby a mist of very small liquid droplets is produced in the swirling gases and solid catalyst particles are weighted by said droplets and maintaining a velocity of said swirling gases sufficient to effect mechanical separation of said droplets and solid particles from uncondensed gases and vapors.

3. The method of separating powdered catalyst from hot hydrocarbon gases and vapors and of preventing catalyst from entering a fractionation zone which comprises introducing a stream of hot hydrocarbon vapors and suspended powdered catalyst into a dry separation zone, separating most of the catalyst from the hot hydrocarbons in said zone, then cooling the hydrocarbons by the direct injection thereinto of a vaporizable liquid and subsequently separating the remaining catalyst from said hot hydrocarbon gases and vapors by wet centrifugal separation.

4. The method of claim 3 wherein the wet centrifugal separation is effected by introducing gas oil into the hot hydrocarbon stream from which most of the catalyst has already been removed, regulating the amounts of introduced gas oil to produce a mist of liquid droplets, whereby the catalyst particles are transferred from said gases to said mist and subjecting said mist to centrifugal action for the separation of liquid droplets from hydrocarbon gases and vapors.

5. The method of separating residual powdered catalyst material from hot hydrocarbon vapors which comprises cooling said vapors to a temperature of incipient condensation and tangentially introducing said cooled vapors into a centrifugal separator in order to effect a swirling motion of said vapors in said separator, introducing a liquid hydrocarbon mist into said swirling vapors whereby the solid catalyst particles are weighted by contact with the liquid droplets of said mist and condensed vapors and maintaining a sufficient swirling velocity of said vapors in said separator to separate said mist and condensed vapors together with catalyst particles from the gases leaving said separator whereby the vapors leaving said separator are substantially denuded from catalyst particles before they enter a fractionation zone.

6. The method of claim 5 wherein the cooling of said vapors is effected by introducing a vaporizable hydrocarbon liquid into the vapor stream before said stream enters said separation zone.

7. The method of claim 5 wherein the vapors are sufficiently cooled before they enter the separation zone to prevent appreciable vaporization of liquid in said separation zone.

8. The method of operating a powdered catalyst system for the conversion of hydrocarbon oil charging stocks into motor fuel which method comprises vaporizing said charging stocks in pipe still coils and contacting said charging stock vapors with powdered catalyst suspended in a stream of said charging stock vapors in a reaction zone maintained at conversion temperature, separating about 99% to 99.9% spent catalyst from said stream, stripping hydrocarbons from the separated catalyst, suspending the stripped catalyst in a regeneration gas stream, regenerating said catalyst, returning said regenerated catalyst for suspension in further amounts of vaporized charging stock, commingling with incoming liquid charging stock the hot stream of vapors from the reaction zone after the approximately 99% to 99.9% of the spent catalyst has been separated therefrom, employing a sufficiently low temperature in the commingling step to partially condense the vapor stream and pick up the bulk of the remaining unseparated spent catalyst in said incoming charging stock to form a slurry before said charging stock passes through said pipe still coils, passing the uncondensed portion of the vapor stream to a fractionation zone, and heating said slurry of spent catalyst and incoming charging stock to conversion temperature prior to any contacting of said charging stock with regenerated catalyst.

9. The method of operating a powdered catalyst system for the conversion of hydrocarbon oil charging stocks which method comprises contacting hydrocarbon oil charging stock vapors with powdered catalyst in a reaction zone while maintaining powdered catalyst suspended in a stream of said vapors, separating at least about 99% of the spent catalyst from said vapor stream in a dry separation zone, separating the bulk of the remainder of the spent catalyst from said stream in a subsequent wet separation zone by contacting it with liquid charging stock at a temperature sufficiently low to condense the higher boiling components of said vapor stream whereby at least about .1% but less than 1% of the total spent catalyst is added to said charging stock, heating said charging stock to conversion temperature in pipe still coils in the presence of said added spent catalyst, stripping and regenerating spent catalyst separated in said dry separation zone and contacting said regenerated catalyst with said hydrocarbon oil charging stock after it has been heated to conversion temperature in the presence of said spent catalyst separated in said wet separation zone.

10. The method of catalytically cracking a hydrocarbon charging stock by means of powdered catalyst having a particle size below 200 microns which method comprises heating said charging stock in a confined stream to a temperature of about 850 to 1050° F. whereby said charging stock is vaporized and brought substantially to conversion temperature, suspending in said charging stock vapors about .2 to 20 pounds of powdered catalyst per pound of oil employed and introducing said suspended catalyst by means of said charging stock vapors into a reaction zone, contacting said vapors with said catalyst in said reaction zone for a period of time exceeding one second but not exceeding fifty seconds, separating about 99 to 99.9% of the catalyst from contacted vapors in a dry separation zone, then separating the remaining about 1 to .1% of the catalyst from the contacted vapors in a wet separation zone by commingling said vapors with liquid charging stock at a temperature sufficiently low to condense the higher boiling components of said contacted vapors whereby the remaining catalyst particles are picked up in charging stock, effecting the heating of the charging stock in the presence of the catalyst picked up in the wet contacting zone, stripping and regenerating the catalyst separated in the dry separation zone and resuspending said regenerated catalyst in vaporized charging stock subsequent to said heating step.

ROBERT E. BUTIKOFER.